United States Patent

Hearns et al.

[15] 3,700,370
[45] Oct. 24, 1972

[54] FILM SIZE CONTROL APPARATUS

[72] Inventors: Harold L. Hearns; Harold J. Donald, both of Midland, Mich.

[73] Assignee: The Dow Chemical Company, Midland, Mich.

[22] Filed: March 2, 1970

[21] Appl. No.: 15,454

[52] U.S. Cl. ............... 425/140, 425/326, 425/172
[51] Int. Cl. .............................................. B29d 7/02
[58] Field of Search......... 18/2 HA, 14 S; 164/4, 154; 33/148 H, 147 N, 147 L, 143 L

[56] References Cited

UNITED STATES PATENTS

| | | | |
|---|---|---|---|
| 3,513,501 | 5/1970 | Hearns | 18/2 HA |
| 3,125,616 | 3/1964 | Cook et al. | 18/145 X |
| 3,466,356 | 9/1969 | Carlson et al. | 18/145 X |
| 3,233,328 | 2/1966 | Schooley | 33/143 L |
| 3,100,889 | 8/1963 | Cannon | 33/143 L X |
| 3,161,704 | 12/1964 | Le Grand et al. | 18/2 HA X |

FOREIGN PATENTS OR APPLICATIONS

| | | | |
|---|---|---|---|
| 1,017,398 | 1/1966 | Great Britain | 18/145 |
| 602,398 | 2/1960 | Italy | 18/145 |

*Primary Examiner*—J. Spencer Overholser
*Assistant Examiner*—Norman E. Lehrer
*Attorney*—Griswold and Burdick, Burke M. Halldorson and Richard G. Waterman

[57] ABSTRACT

Apparatus and method for automatically injecting and/or withdrawing air from tubularly extruded film when needed, to obtain precise size control of the film. Such apparatus can include movable, opposed follower assemblies gravity operated inwardly toward the film to continuously engage opposite sides thereof, respectively, while still in the inflated condition. Any relative movement between the followers indicates a film size change, and is converted into electrical signals such as by potentiometer means or the like. Such signals energize electronic circuitry which, in turn, operates electrical valving means for inserting or withdrawing air from the film at the proper moment. The apparatus is not affected by film edge wrinkle or lateral sway of the film during measurement and, in addition, does not require drive motors or the like to operate.

4 Claims, 7 Drawing Figures

INVENTORS.
Harold L. Hearns
Harold J. Donald
BY
Burke N. Halldorson
ATTORNEY

INVENTORS.
Harold L. Hearns
Harold J. Donald
BY
Burke M. Halldorson
ATTORNEY

3,700,370

FILM SIZE CONTROL APPARATUS

BACKGROUND OF THE INVENTION

Field of the Invention

The present invention relates generally to a method and apparatus for controlling the size of tubularly extruded film by injecting and/or withdrawing air therefrom as required.

More particularly, the invention relates to such method and apparatus wherein film size changes are detected while the film is still in an inflated condition; and which operates without requirement of drive motors or the like as have been conventionally employed heretofore in monitoring film size changes.

BACKGROUND OF THE INVENTION

To manufacture film of high quality and with maximum economy, it is necessary to precisely control the size of the film as it is being continuously extruded. Apparatus for performing such a function has frequently involved the use of monitoring devices to continuously measure film size; and control means for correcting film size deviations responsive to signals received from the monitoring equipment.

To operate at an optimum level, the size control apparatus must quickly and precisely measure the film oftentimes despite film lateral sway or movement at the measuring station. Most optimally, such measurements are made at the earliest possible stage in film manufacture, whereby rapid response to over or under inflation of film is enabled. In addition, it is desirable that the size control apparatus be of relatively uncomplicated construction to minimize incidence of apparatus breakdown, and accompanying down-time in the film manufacturing operation; but yet be of sufficient sophistication to measure deviations even of relatively minor extent.

Film size control apparatus, of a type as has heretofore been conventional, for example, normally measures tubularly extruded film by continuously monitoring its edge to edge width or lay flat dimension. Film edge wrinkle or distortion thus hampers the measurement and can give false readings. Moreover, response is necessarily delayed until after flattening the film, resulting in an undesirable time lag between detection of film size change and the actual incurrence of the same and, therefore, a time lag in the corrective action required to bring the film back to "specification" size.

In addition, such prior art devices are frequently undesirably complex, employing, for example, photoelectric cells, electropneumatic devices and the like to detect film edge positions, preferably without edge contact. Such devices oftentimes necessarily require motor drives or the like to reversibly move the film edge detectors such that the same continuously follow any lateral movement of the film edges. The use of motor drives and the necessary linkage equipment associated therewith, such as precisely machined gear drives, adds to the expense of the measuring equipment and, in addition, makes for a complicated measuring system thus adding to down-time when repair is required.

It is among the objects of the present invention, therefore, to provide the following;

An improved method and apparatus for automatically controlling the size of film which is tubularly extruded;

Such method and apparatus which operates accurately irrespective of film edge wrinkle or film lateral sway or movement at the measuring station;

Improved method and apparatus of the type indicated wherein the same is desirably of a relatively uncomplicated construction, but is yet highly sensitive to film size changes, and which responds rapidly to correct film size deviations; and Such method and apparatus capable of inserting and/or withdrawing air from the tubular film as required and in proper amounts, whereby precise film control is obtained.

BRIEF SUMMARY OF INVENTION

Briefly then, the present invention contemplates an improved control apparatus for automatically and continuously injecting and/or withdrawing air from tubularly extruded film, when needed, to obtain precise size control of the film. Such apparatus can comprise opposed, movable follower assemblies gravity operated inwardly toward the film, and adapted to engage opposite sides of the same while still in an inflated condition. Relative movement between the followers, indicating a film size change, is converted to electrical signals such as by potentiometer or transducer means. The latter can be of a type, for example, adapted to produce a variable DC voltage signal responsive to such follower movements. The voltage signals, in turn, can operate an electrically controlled air valve connected into tubing feeding air into the film. Such a valve can be of an on-off type adding air to the film when necessary; or can be a more complex valve employable to either inject and withdraw air from the film as required. As will be explained more fully hereinafter, the control apparatus of the present invention is not effected by film edge wrinkle or swaying or meandering of the film to the left or right at the measuring station. Moreover, such apparatus operates to give instant response to film deviations at selectable levels of sensitivity.

The preferred embodiments of the invention are shown in the accompanying drawing wherein wheresoever possible like reference numerals designate corresponding materials and parts throughout the several views thereof wherein.

DESCRIPTION OF THE PREFERRED EMBODIMENTS

Figures 1, 3:
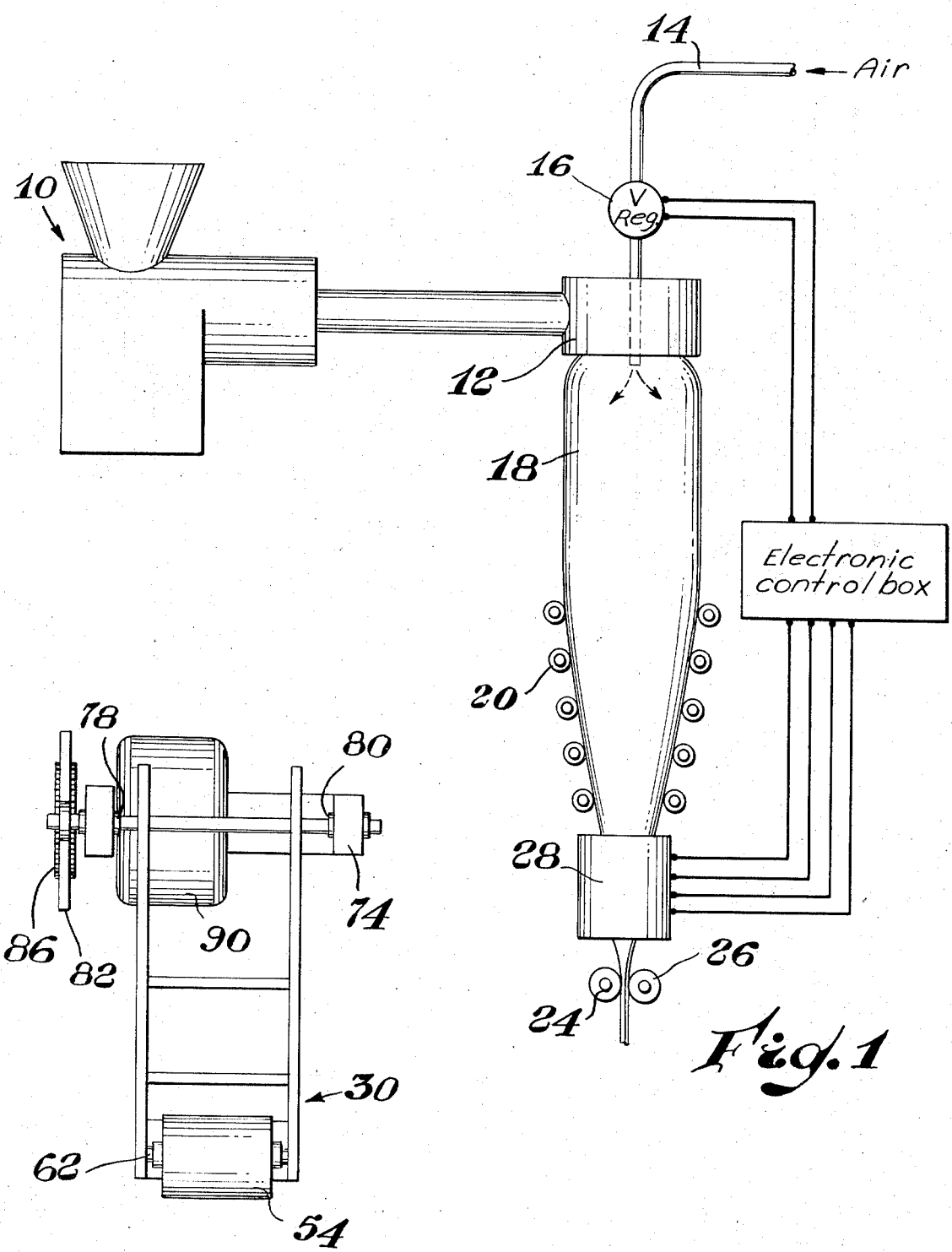
FIG. 1 is a schematic and diagrammatic representation of the tubular process of film extrusion and, in addition, shows the relative positioning of a film size control apparatus constructed according to the principles of the present invention.
FIGS. 3–5 are partial views of the size control apparatus of FIG. 2 taken along reference lines 3—3, 4—4, and 5—5, respectively, thereof.
Figure 2:
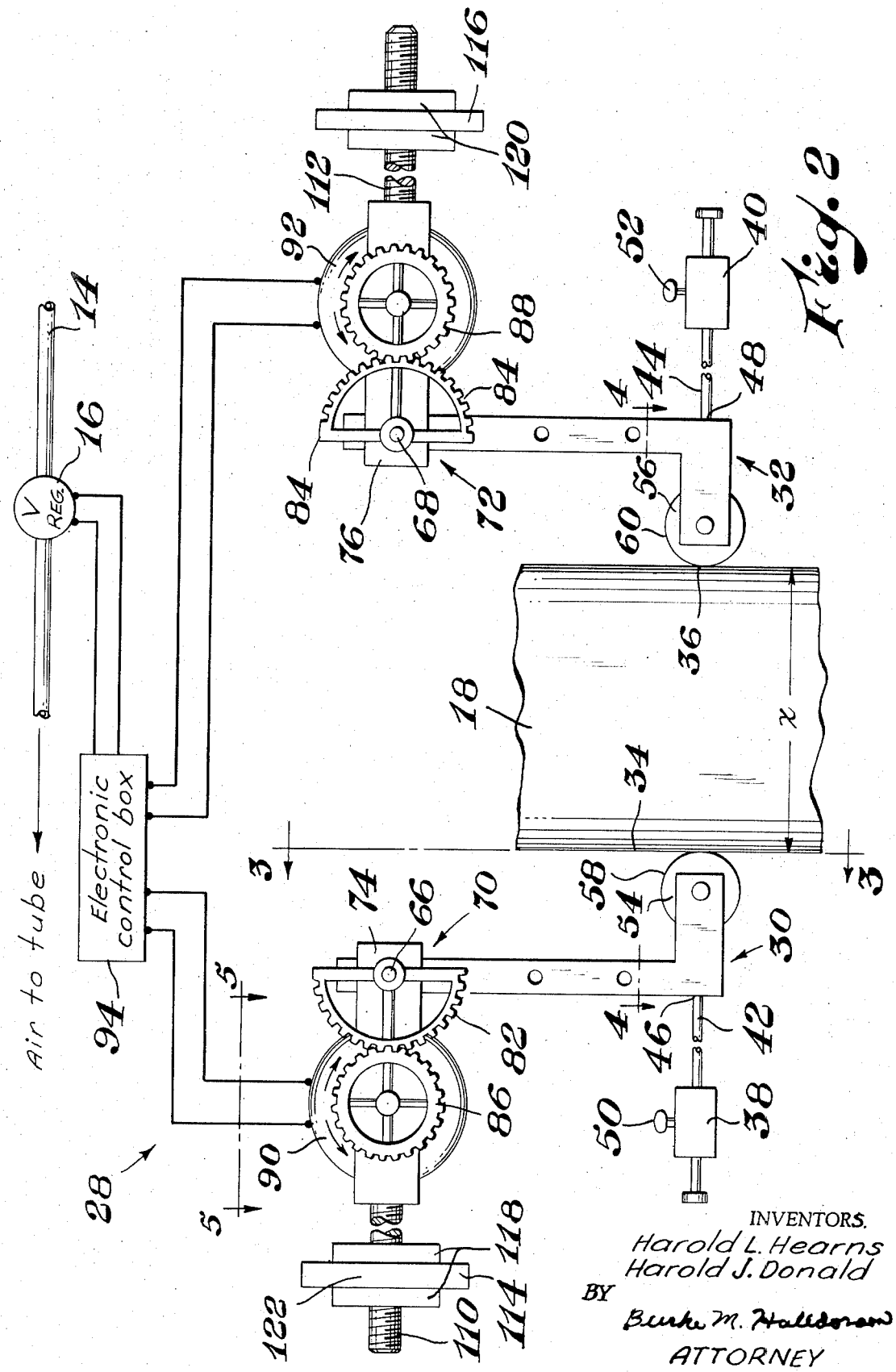
FIG. 2 is a schematic and diagrammatic representation showing in more detail the film size control apparatus of FIG. 1.
Figure 4:
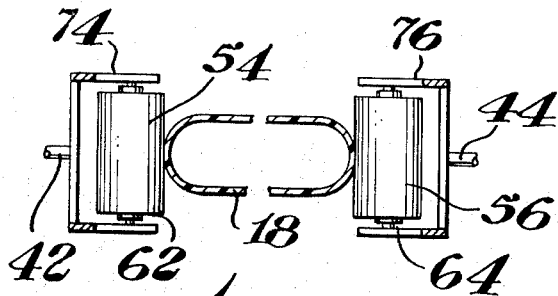

Looking now with more particularity at the drawings, FIG. 1 shows schematically an arrangement for the continuous automatic control of film which is tubularly extruded. A film source or extruder 10 receives the polymeric material, heat plastifies it and extrudes it tubularly through annular die 12 with the aid of air pressure coming from tube 14 through an electrically operated regulator valve 16. The extruded film 18 emerges as a tubular envelope, the width or size of which is ultimately governed by the amount of air allowed to enter annular die 12 via valve 16. Film 18 is gradually flattened by a collapsing rack 20 and assumes an intermediate oval-like configuration before entering between nip rolls 24 and 26. At this intermediate stage, it is ready to be acted upon by the film size control apparatus denoted generally in FIG. 1 as 28.

FIGS. 2–5 show in more detail control apparatus 28 wherein film 18 is shown as passing between a pair of opposed vertically positioned follower assemblies 30 and 32 movably engaged against opposite film sides 34 and 36, respectively. Followers 30 and 32 are pivotally movable toward and away from each other about the axis of shafts 66 and 68, respectively, and are gravity operated inwardly toward the film such as by counter weights 38 and 40. Weights 38 and 40 are desirably slidably movable or adjustable on rods 42 and 44 which, in turn, are rigidly attached, for example, to the back side of the followers as denoted at 46 and 48. Thumb screws 50 and 52 are employed to permit adjustable setting of weights 38 and 40 on rods 42 and 44, whereby the pressure exerted on the film sides by the followers can be adjustably controlled responsive to side firmness.

To prevent bruising or tearing of the film by contact with followers 30 and 32, rolls 54 and 56 are employed as a part of the follower structure making actual contact with the film. Such rolls optimally include smooth polished surface qualities at their contacting surfaces 58 and 60, respectively, and are desirably freely rotatable such as in bearing assemblies as indicated generally at 62 and 64 (See FIG. 4).

The aforementioned shafts 66 and 68 are rigidly affixed together, for example, with the upper vertical extents 70 and 72 of the followers. In turn, the shafts are rotatably carried by a pair of yoke members 74 and 76, respectively, such as by use of inset bearing assemblies as are denoted at 78 and 80 in FIG. 3.

Spur gears 82 and 84 are keyed to shafts 66 and 68, respectively, and responsive to arcuate movements of the followers, operate gears 86 and 88 which, in turn, operate potentiometers or electronic converting means 90 and 92. The latter convert the mechanical movements of followers 30 and 32 into electric signals operating an electronic control box 94 which, in turn, operates regulator valve 16, as will be explained in more detail hereinafter.

Figure 5:
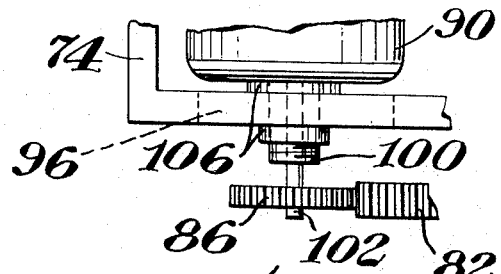

Referring now to FIG. 5, potentiometers 90 and 92 can be of a commonly supplied variety, each including, for example, a rigid cylindrical mounting piece 100 adapted to fit through apertures 96 for purposes of conveniently mounting the potentiometers rigidly in yoke members 74 and 76. The potentiometer shaft 102 turns inside member 100 and outwardly thereof is keyed to gears 86 and 88 operating the same as explained above. Most desirably, members 100 are threaded at their exterior surfaces, and a lock nut and spacer assembly denoted at 106 employed to rigidly clamp the potentiometers to the yoke members.

Referring again to yoke members 74 and 76, the same are rigidly mounted to opposed horizontally positioned threaded mounting shafts 110 and 112, respectively. Shafts 110 and 112 are received opposite the yoke members, for example, in apertures (not shown) associated with rigid frame sections designated at 114 and 116, respectively. Reversely threaded lock nut assemblies 118 and 120, for example, can be employed to rigidly clamp the mounting shafts to the frame pieces.

OPERATION

Control apparatus 28 is most optimally mounted or operated at a spaced distance upwardly of nip rolls 24 and 26. Strategic positioning or mounting of apparatus 28 thus avoids contact between followers 30 and 32 and wrinkled regions of the film as is oftentimes experienced in the vicinity immediately adjacent nip rolls 24 and 26 in the process of flattening film 18 therebetween.

To start up apparatus 28, the distance X between rolls 54 and 56 is preset by adjustably moving threaded mounting shafts 110 and 112 in frame pieces 114 and 116. Lock nut assemblies 118 and 120 are first loosened and shafts 110 and 112 then moved until the preset distance X is realized with followers 30 and 32 in a vertically orientated position, as is shown in FIG. 1. Thereafter, lock nut assemblies 118 and 120 are tightened to rigidly clamp the mounting shafts in place for continuous operation of device 28. Any subsequent increase or decrease in the size of film 18 from the preset distance X, is immediately detected by movement of followers 30 and 32 outwardly (film too large), or inwardly toward each other (film too small).

Figure 6:
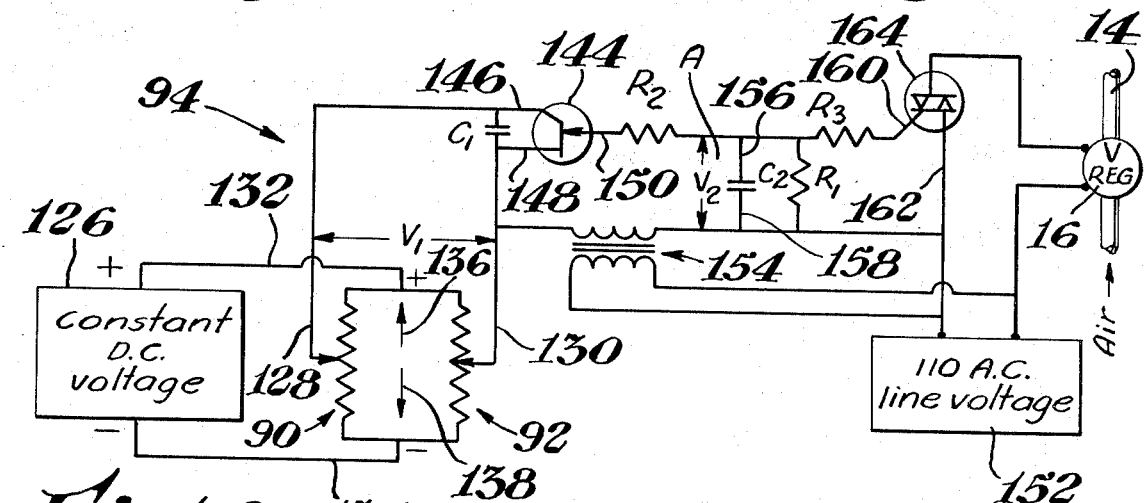
FIG. 6 is a schematic representation of the electronic circuitry associated with the film size control apparatus of the present invention.

Responsive to the movement of followers 30 and 32, potentiometers 90 and 92 are operated, as is best shown schematically in the circuitry diagram of FIG. 6. Potentiometers 90 and 92 are connected in parallel and energized such as by a constant DC voltage source placed thereacross as is denoted generally at 126; and are calibrated to register a zero voltage difference $V_1$ across wiper means or leads 128 and 130 at operating conditions where followers 30 and 32 remain at the preset distance X apart from each other. Subsequent relative movement between followers 30 and 32, however, moves either or both leads 128 and 130 from the rest or zero calibrated position, whereby a positive or, alternately, a negative voltage difference $V_1$ is applied across leads 128 and 130.

For example, movement or rotation of gear 86 clockwise, responsive to inward movement of follower 30, moves lead 128 in the direction toward the positive terminal 132 of voltage source 126, as indicated by arrow 136; while oppositely, counterclockwise movement of gear 86 responsive to outward movement of follower 30 moves lead 128 in the direction of arrow 138 or toward the negative terminal indicated at 134. Potentiometer 92 operates in reverse. That is, inward movement of follower 32 turns gear 88 counterclockwise and, therefore, moves lead 130 toward negative terminal 134; and conversely responsive to outward movement of follower 32, gear 88 is turned clockwise, whereby lead 130 is moved closer to the positive terminal 132. Basically six operating conditions exist:

1. Inward movement of either or both followers 30 and 32, responsive to decreased film size, and with resultant movement of lead 128 toward positive terminal 132 and/or movement of lead 130 toward the negative terminal 134. Voltage $V_1$, therefore, becomes positive.

2. Outward movement of either or both followers 30 and 32, responsive to decreased film 18 size. Voltage $V_1$, therefore, becomes negative.

3. Parallel or joint movement of followers 30 and 32 responsive to film lateral sway or meandering without film 18 size change. Voltage $V_1$, therefore, remains at the zero level.

4. A combination of (1) and (3) above wherein film lateral sway or meandering is accompanied by a decrease in film 18 size, and resultant in a positive voltage $V_1$.

5. A combination of (2) and (3) above wherein film lateral sway or meandering is accompanied by increase in film 18 size, and resultant in a negative voltage $V_1$.

6. Static running conditions wherein film 18 size and lateral position remain constant, and with zero follower 30 and 32 movement, and zero voltage $V_1$.

Referring yet more specifically to FIG. 6, there is, in addition, shown the preferred embodiment of the circuitry of electronic control box 94 which, responsive to the signals from leads 128 and 130 or voltage difference $V_1$, operates regulator valve 16, as explained hereinbefore. Control box 94, for example, can comprise a solid state silicon controlled rectifier 144. The rectifier gate and cathode leads 146 and 148, for example, can be connected directly to leads 128 and 130, respectively, of potentiometers 90 and 92. It may be noted that a capacitor $C_1$ is desirably placed across leads 146 and 148 of the rectifier to filter out possible AC pickup, such as from surrounding equipment or the like.

Rectifier 144 is selected to operate or conduct current at a certain positive voltage $V_1$ across potentiometer leads 128 and 130, such positive voltage $V_1$ being resultant of either conditions (1) or (4) above. At a positive voltage $V_1$, rectifier 144 thus conducts or permits DC current to pass from cathode lead 148 to its anode lead 150, the latter forming a part of an adjacent circuit loop designated as A. Circuit loop A can be operated from a conventional 110 V AC line voltage source as denoted at 152, but reduced such as through a step-down filament transformer indicated at 154.

In the operating or firing condition, therefore, a pulsating DC current passes through rectifier 144 and charges, for example, a capacitor designated as $C_2$ thereby placing a voltage difference $V_2$ across terminals 156 and 158 of the latter. Terminals 156 and 158, in turn, can be connected to the leads 160 and 162, respectively, of a solid state triac element indicated schematically at 164. At a sufficient voltage $V_2$, triac 164 fires or operates to pass AC current from AC line source 152 to operate regulator valve 16. The latter, in turn, opens to forward compressed air internally to film 18. Valve 16 can comprise, for example, a conventional off-on solenoid operated valve.

As the film expands from increased internal air pressure, followers 30 and 32 are forced outwardly until eventually condition 6 is reached, thereby, reducing $V_1$ to zero. As a result, rectifier 144 stops conducting current and $C_2$ is de-energized such as by passing its charge through a resistor $R_1$ connected in parallel with it. $V_2$, in turn, is reduced to zero, thereby, inactivating triac 164 and passage of current from line source 152 to valve 16, thus, stopping air flow to film 18 at the proper moment.

Desirably, protective resistors indicated at $R_2$ and $R_3$ are additionally included in the design of the circuitry of electronic control box 94 to protect the rectifier and triac elements, respectively, from damage caused by excessive current in the system.

Referring now to conditions (2) and (5) above, or a condition of overinflation of the film, the same can be relieved somewhat at least by permitting continuous backflow of air from the film. For example, a small aperture or needle valve can be provided in extruder head 12 or tubing 14 to permit small amounts of air to escape continually from inside the film. It may be noted, however, that control apparatus 28 desirably indicates by distinct signals both the conditions of over and underinflation of the film by negative and positive voltage $V_1$, respectively. Therefore, such control apparatus is advantageously employable to either automatically insert or withdraw air from the film, when necessary, and in the proper amounts. Electronic circuitry responsive to a negative voltage $V_1$, for example, can be like that described above, but with the gate and cathode leads of the rectifier connected to potentiometer leads 128 and 130, respectively, or in other words, reversely connected to that shown in FIG. 6. The circuitry responsive to a negative voltage $V_1$ can then operate, for example, a second solinoid type valve adapted to open tubing 14 to permit free backflow of air from film 18 to reduce its size appropriately to preset dimension X. The circuitry would then deactivate responsive to inward movement of followers 30 and 32 to the rest or neutral position, thereby, closing the valve at the proper interval.

In addition, it may be noted that lateral movement or sway of film 18 without film size change (condition 3) moves followers 30 and 32 in parallel fashion an equal amount, but without a change in the preset distance X between the followers. Leads 128 and 130, therefore, are moved together equal amounts, respectively, toward a common terminal 132 or 134 and, accordingly, do not register a change in voltage $V_1$. Film lateral movement accompanied by film size change (conditions 4 and 5) operate in a like manner in that only the follower movement responsive to film size change; or only the relative movement between the followers varies $V_1$. Thus, apparatus 28 will respond only to the extent of the change in size of the film, if any, accompanying such lateral film movements.

The tolerances built into apparatus 28 can be controlled by any one of several adjustments. For example, rectifier 144 can be made sensitive to only voltages $V_1$ above a desired specified amount, as for example, 0.2 volt, 0.4 volt, 0.6 volt, etc. Thus, only small relative movements between the followers which generates a voltage $V_1$ below the specified lower limit would not operate electronic control box 94. Furthermore, the ratio between gears 86 and 82, and 88 and 84, respectively, can be changed to make the system more or less sensitive as desired. Alternately, of course, potentiometers 90 and 92 can be connected directly to shafts 66 and 68, thereby dispensing with gears 82 and 84, and 86 and 88, and thus also any adjustments in sensitivity that may be obtained by changing the indicated gear ratios. In addition, the voltage at source 126 can be increased to increase sensitivity, or decreased to decrease the same as desired. The selections of potentiometers 90 and 92 of more or less sensitivity gives even further flexibility in obtaining the desired tolerance parameters. As yet another example, at the rest or neutral position, potentiometers 90 and 92 could be calibrated to supply a positive voltage $V_1$ slightly less than that required to operate rectifier 144. Thus, a proportionately smaller amount of relative inward movement between the followers, responsive to decreased film 18 size, would be required to operate valve 16.

Figure 7:
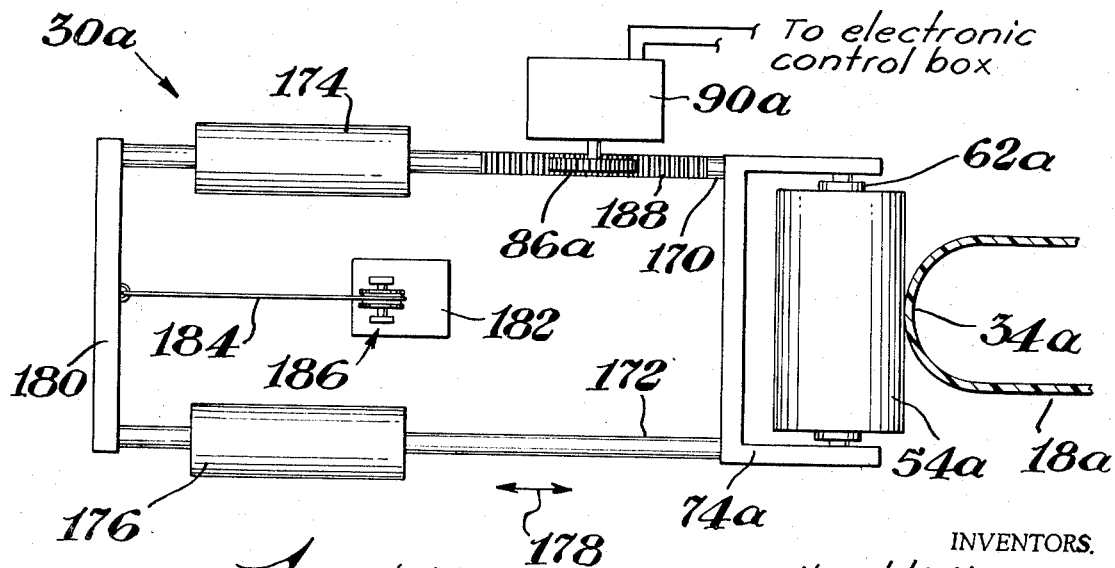
FIG. 7 is a top view illustrating a modified form of the apparatus of the present invention.

FIG. 7 shows a modified follower assemblage 30a (only one shown) including a roll 54a freely rotatable in a bearing assemblage denoted at 62a. Bearing assemblage 62a is, in turn, associated with a yoke member 74a. The yoke member, in turn, is rigidly connected together with horizontally disposed shaft members 170 and 172 which extend parallel each other from the backside of the yoke member. Shafts 170 and 172 are supported, such as for example, in roller bushing 174 and 176 for reverse movement of roll 54a in the direction indicated by arrows 178. A cross piece 180 is connected between shafts 170 and 172. A weight 182 is attached to cross piece 180 by a cord 184 through a pulley system such as is schematically denoted at 186. Weight 182, thus, urges roll 54a inwardly to movingly engage side 34a of film 18a for detecting film size changes, as explained hereinbefore. Shaft 170 is geared as denoted at 188 and responsive to the movement of follower assemblage 30a, operates potentiometer 90a through gear 86a. The amount of pressure exerted by the follower assemblage 30a on film 18a, of course, can be controlled by proper selection of weight 182 or, alternately, a spring, for example. As yet an additional embodiment (not shown) roller bushing 174 or 176 could be modified to function additionally as an electrical transducer, thereby dispensing with the need for gears 86a and 188, and potentiometer 90a.

While certain representative embodiments and details have been shown for the purpose of illustrating the invention, it will be apparent to those skilled in the art that various changes and modifications can be made therein without departing from the spirit and scope of the invention.

What is claimed is:

1. Apparatus for controlling the size of tubular extruded film, and operative at a region in the manufacture of the film where the film is inflated and moving forward, said apparatus comprising conforming means to engage opposite sides of the film to partially collapse the film, oppositely disposed areas of the film being bulged outwardly in configuration by the pressure of the conforming means, a pair of oppositely disposed independently movable film followers, means to gravity operate said followers to urge the same inwardly toward said film to resiliently ride against and follow any lateral movement of said bulged areas, respectively, whereby relative movement between said followers automatically indicates film size changes, and means for controlling the size of said film responsive to the relative movement of said followers.

2. The apparatus of claim 1 wherein said followers comprise opposed members freely swingable toward and away from each other, and gravity operated inwardly to movingly engage said bulged areas, respectively, of the film.

3. The apparatus of claim 1 wherein said followers are freely movable toward and away from each other, and are counter-weighted inwardly such as to be resiliently urged against said bulged areas, respectively.

4. The apparatus of claim 1 wherein said conforming means comprises a collapsing rack.

* * * * *